(12) United States Patent
Du et al.

(10) Patent No.: US 6,381,085 B1
(45) Date of Patent: *Apr. 30, 2002

(54) ZERO FORCING ADAPTIVE EQUALIZATION IN A DISK DRIVE READ CHANNEL

(75) Inventors: Li Du, Denver; Mark Stephen Spurbeck, Superior; German Feyh, Boulder, all of CO (US)

(73) Assignee: Cirrus Logic, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/351,736

(22) Filed: Jul. 12, 1999

(51) Int. Cl.[7] .............................................. G11B 5/035
(52) U.S. Cl. ....................................... 360/65; 375/350
(58) Field of Search ..................... 360/65, 46; 375/232, 375/350, 354; 708/323

(56) References Cited

U.S. PATENT DOCUMENTS

| | | | |
|---|---|---|---|
| 4,866,647 A | | 9/1989 | Farrow |
| 5,313,472 A | * | 5/1994 | Hara ............................ 371/31 |
| 5,467,232 A | * | 11/1995 | Ouchi et al. ................... 360/65 |
| 5,487,085 A | * | 1/1996 | Wong-Lam et al. ......... 375/230 |
| 5,563,819 A | | 10/1996 | Nelson |
| 5,696,639 A | | 12/1997 | Spurbeck et al. |
| 5,717,619 A | | 2/1998 | Spurbeck et al. |
| 5,726,818 A | | 3/1998 | Reed et al. |
| 5,744,993 A | * | 4/1998 | Sonntag ....................... 327/307 |
| 5,754,353 A | | 5/1998 | Behrens et al. |
| 5,760,984 A | | 6/1998 | Spurbeck et al. |
| 5,796,535 A | | 8/1998 | Tuttle et al. |
| 5,812,336 A | | 9/1998 | Spurbeck et al. |
| 5,903,857 A | | 5/1999 | Behrens et al. |
| 5,909,332 A | | 6/1999 | Spurbeck et al. |
| 5,917,668 A | | 6/1999 | Behrens et al. |
| 5,966,415 A | * | 10/1999 | Bliss et al. .................. 375/350 |
| 6,061,395 A | * | 5/2000 | Tonami ....................... 375/232 |

FOREIGN PATENT DOCUMENTS

EP    0 805 447 A2    5/1997

OTHER PUBLICATIONS

Feyh, G., "Subsampled Digital Retiming for Optical Disk," Cirrus Logic, Inc., Cirrus Logic, Inc. (Broomfield, CO), p. three.
Proakis, John G., "Digital Communications," Department of Electrical and Computer Engineering, Northeastern University, 3rd ed., McGraw–Hill, Inc., p. 637–638.

* cited by examiner

*Primary Examiner*—David Hudspeth
*Assistant Examiner*—Dan I. Davidson (57) ABSTRACT

The invention includes disk drive circuitry, systems, and methods. The disk drive system comprises control circuitry and a disk device. The disk device stores data and transfers an analog signal representing the data. The control circuitry receives the analog signal, converts the analog signal into a digital signal, and transfers the digital signal. The control circuitry includes zero forcing circuitry and an adaptive filter. The zero forcing circuitry produces new coefficients for the adaptive filter. The control circuitry may also include an analog-to-digital converter, detector, decoder, and LMS circuitry. The analog-to-digital converter receives and samples the analog signal to generate a sampled signal. The adaptive filter shapes the sampled signal based on coefficients to produce an equalized signal. The detector detects binary data from the equalized signal, and the decoder decodes the binary data to generate the digital signal. Either the zero forcing circuitry or the LMS circuitry may be selected to produce the coefficient signal that adjusts the coefficients in the adaptive filter.

13 Claims, 7 Drawing Sheets

ZERO FORCING ADAPTIVE EQUALIZATION IN A DISK DRIVE READ CHANNEL

BACKGROUND OF THE INVENTION

1. Field of the Invention

The invention is related to the field of disk drive systems, and in particular, to disk drive systems and circuitry that use a zero forcing algorithm to produce the coefficients for the adaptive filter in the read channel.

2. Statement of the Problem

Figure 1:
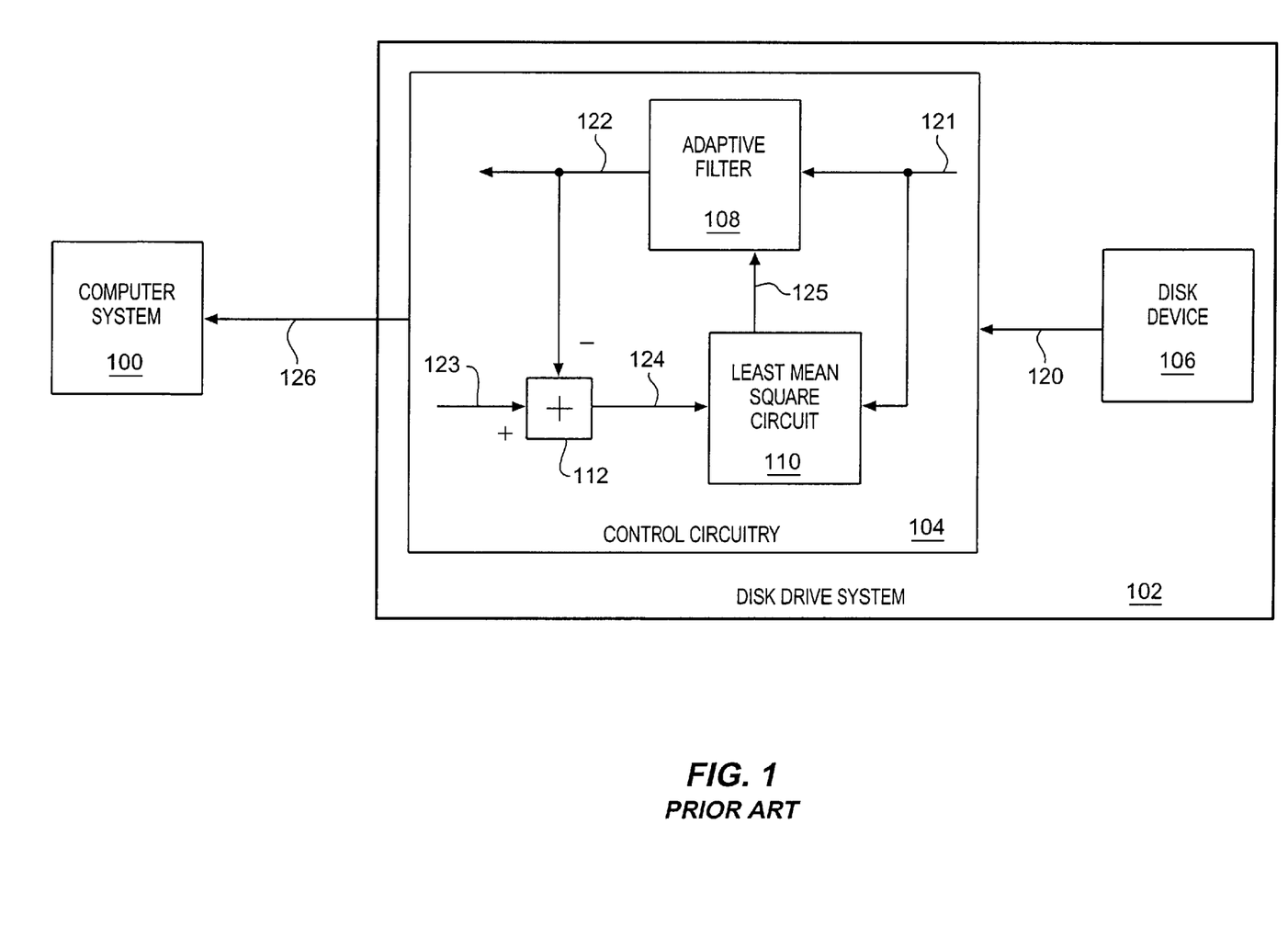
FIG. 1 is a block diagram that depicts a conventional disk drive system.

FIG. 1 depicts a conventional system that includes a host computer system 100 and a disk drive system 102. The disk drive system 102 includes control circuitry 104 and disk device 106. The disk device 106 stores data for the computer system 100. To transfer this data from the disk device 106 to the computer system 100, the disk device 106 transfers a signal 120 to the control circuitry 104. The signal 120 is an analog representation of the data. The control circuitry 104 converts the signal 120 into a signal 126 for the computer system 100. The signal 126 is a digital representation of the data and is suitable for processing by the computer system 100. Thus, the control circuitry 104 converts an analog representation of the data into a digital representation of the data.

Those skilled in the art will appreciate that numerous conventional components of the disk drive system 102 are not depicted on FIG. 1 for the purpose of clarity. For example, the disk device 106 typically includes disks on which data is written, heads to write/read the data to/from the disks, and motors that position heads and rotate the disks. The control circuitry 104 typically includes a controller, servo circuitry, and a read channel. The controller manages data transfers. The servo circuitry controls the motors to position the heads and rotate the disks. The read channel converts the analog signals from the disks into usable digital data. The read channel includes an adaptive filter 108, a Least Mean Square (LMS) circuit 110, and an adder 112 that are shown on FIG. 1.

The adaptive filter 108 is a digital Finite Impulse Response (FIR) filter that receives an input signal 121. The input signal 121 is a sampled version of the signal 120. The adaptive filter 108 processes the samples in the input signal 121 to generate the output signal 122. In particular, the adaptive filter 108 digitally alters pulses in the input signal 121 into a shape that is more suitable for processing by subsequent detector circuitry (not shown). The adaptive filter 108 continually improves its performance by adjusting internal coefficients in response to a coefficient signal 125. It should be appreciated that improving the performance of the adaptive filter 108 will reduce data errors in the signal 126.

The adder 112 receives a copy of the output signal 122 and an ideal signal 123. The ideal signal 123 can be generated in numerous ways, such as using a slicer on the output signal 122 or by using a digital copy of the data stored on the disk device 106. The adder 112 subtracts the output signal 122 from the ideal signal 123 to generate the error signal 124. The adder 112 provides the error signal 124 to the LMS circuit 110.

The LMS circuit 110 receives input signal 121 and the error signal 124. The LMS circuit 110 applies an LMS algorithm to produce the coefficient signal 125 that alters the coefficients in the adaptive filter 108. The LMS algorithm is:

$$C_{K+1} = C_K + \mu e_K X_K$$

where:

$C_{K+1}$=the new coefficient signal 125

$C_K$=the old coefficient signal 125

$\mu$=the step size $e_K$=the error signal 124=$i_K$(ideal signal 123)−$y_K$(output signal i 22); and $X_K$=the input signal 121.

The upper case variables represent vectors that are comprised of scalar values that are represented by lower case variables. For a ten tap filter, the term $e_K X_K$ can be represented by the following values: $[e_K x_K, e_K x_{K-1}, e_K x_{K-2}, e_K x_{K-3}, e_K x_{K-4}, e_K x_{K-5}, e_K x_{K-6}, e_K x_{K-7}, e_K x_{K-8}, e_{Kx} x_{-9}]$. A more economically efficient implementation replaces the term $e_K X_K$ in the LMS algorithm with $x_K E_K$. For a ten tap filter, the term $x_K E_K$ can be represented by the following values: $[x_K e_K, x_K e_{K+1}, x_K e_{K+2}, x_K e_{K+3}, x_K e_{K+4}, x_K e_{K+5}, x_K e_{K+6}, x_K e_{K+7}, x_K e_{K+8}, x_K e_{K+9}]$.

Thus, the LMS circuit 110 improves the bit error rate performance of the disk drive system 102 by adjusting the coefficients in the adaptive filter 108. Unfortunately, the bit error rate performance of the conventional disk drive system 102 suffers because the adaptive filter coefficients do not converge to a solution for optimum bit error rate performance. The convergence problem is derived from the fact that LMS circuit 110 adjusts the coefficients using a Mean Squared Error (MSE) driven process. Although MSE is a convenient metric that correlates with bit error rate, the correlation is not perfect. Thus, the convergence problem in the conventional disk drive 102 permits additional data errors to remain that prevent or slow the operation of the computer system 100. The additional data errors also require more expensive disk drive components to compensate for the errors.

Given the enormous growth in the demand for higher capacity computer data storage, there is an acute need to continually improve the performance of disk drive systems. In particular, solutions are needed to reduce the problem of data errors in disk drive systems. These solutions will allow less expensive components to be used while maintaining or improving current error rates. The cost savings can be passed on to the consumer in the form of less expensive computer data storage.

SUMMARY OF THE SOLUTION

The invention solves the above problem by using a zero forcing algorithm to adjust the coefficients in the adaptive filter. Testing has demonstrated that systems using the zero forcing algorithm have better bit error rate performance than conventional systems using the LMS algorithm. Thus, the invention allows the read channel adaptive filter to converge to a solution closer to the minimum bit error rate than does LMS circuitry using an MSE driven process. Consequently, the problem of data errors in disk drive systems is reduced, so less expensive disk drive components may be used while maintaining or improving current bit error rates.

The invention includes disk drive circuitry, systems, and methods. The disk drive system comprises control circuitry and a disk device. The disk device stores data and transfers an analog signal representing the data. The control circuitry receives the analog signal, converts the analog signal into a digital signal, and transfers the digital signal. The control circuitry includes zero forcing circuitry and an adaptive filter. The zero forcing circuitry produces new coefficients for the adaptive filter.

In some examples of the invention, the control circuitry includes an analog-to-digital converter, adaptive filter, detector, decoder, and both zero forcing circuitry and LMS circuitry. The analog-to-digital converter receives and samples the analog signal to generate a sampled signal. The adaptive filter shapes the sampled signal based on coefficients to produce an equalized signal. The detector detects binary data from the equalized signal, and the decoder decodes the binary data to generate the digital signal. Either the zero forcing circuitry or the LMS circuitry may be selected to produce the coefficient signal that adjusts the coefficients in the adaptive filter.

DETAILED DESCRIPTION OF THE INVENTION

Figure 2:
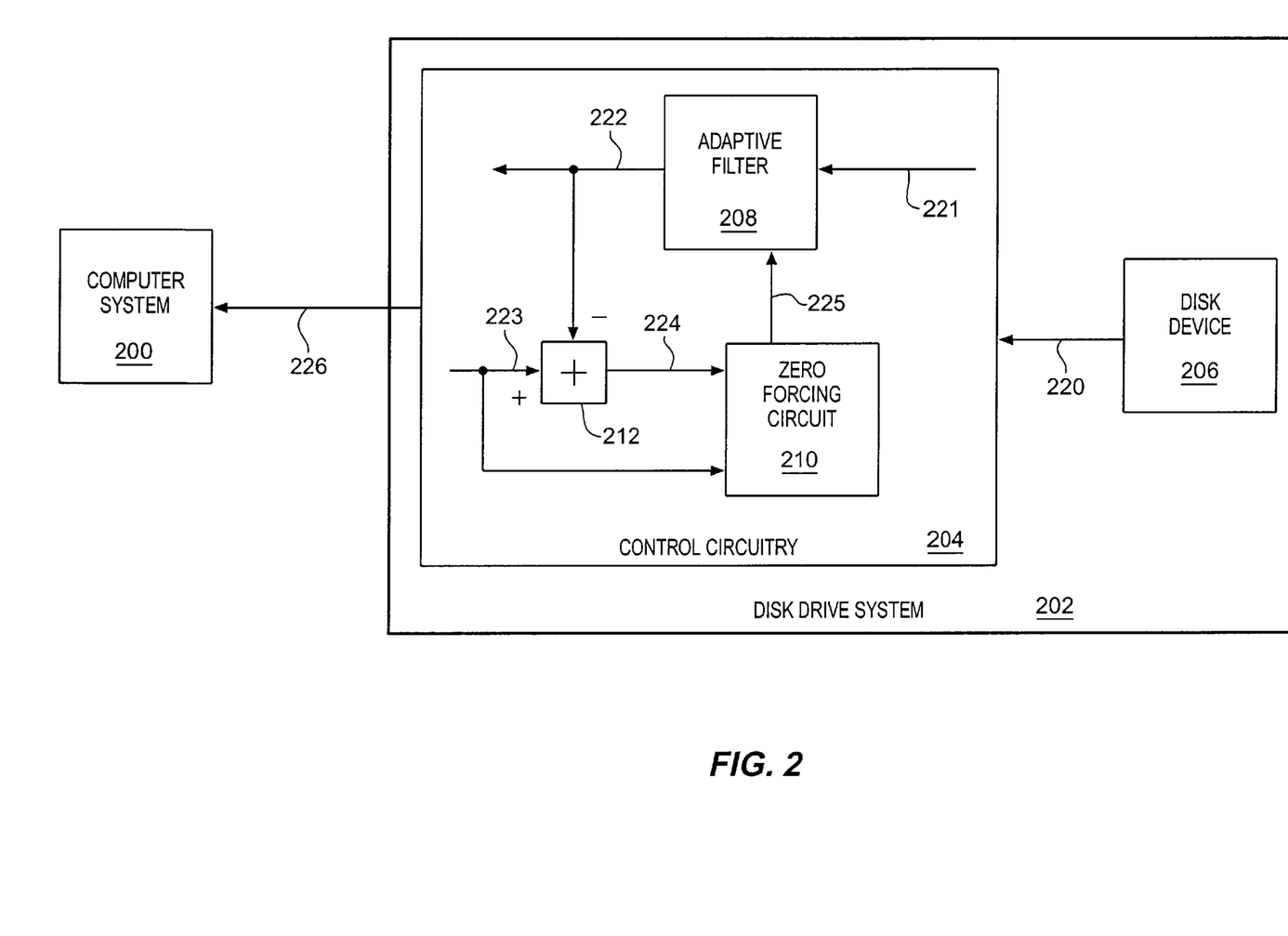
FIG. 2 is a block diagram that depicts a disk drive system in an example of the invention.

Disk Drive System—FIG. 2

FIG. 2 depicts a disk drive system 202 that is configured and operates in accord with the invention. The disk drive system 202 stores data for the computer system 200 and includes control circuitry 204 and a disk device 206. The disk device 206 could be any device that stores the data and transfers a signal 220 to the control circuitry 204. The signal 220 is an analog representation of data for the computer system 200. The control circuitry 204 could be any circuitry that converts the signal 220 into the signal 226 and transfers the signal 226 to the computer system 200. The signal 226 is a digital representation of the data for the computer system 200. The control circuitry 204 is typically comprised of an integrated circuit or a set of integrated circuits. The integrated circuitry typically includes memory that stores instructions and processors that retrieve and execute the instructions to control system operations.

The control circuitry 204 includes an adaptive filter 208, a zero forcing circuit 210, and an adder 212. The adaptive filter 208 receives an input signal 221 that is a sampled version of the signal 220. The adaptive filter 208 processes the samples in the input signal 221 to generate the output signal 222. In particular, the adaptive filter 208 alters pulses in the input signal 221 into a shape that is more suitable for processing by subsequent detector circuitry (not shown). The adaptive filter 208 continually improves its performance by adjusting internal coefficients in response to a coefficient signal 225 from the zero forcing circuit 210.

The adder 212 receives a copy of the output signal 222 and an ideal signal 223. The ideal signal 223 can be generated in numerous ways, such as using a slicer on the output signal 222 or by using a digital copy of the data stored on the disk device 206. The adder 212 subtracts the output signal 222 from the ideal signal 223 to generate the error signal 224. The adder 212 provides the error signal 224 to the zero forcing circuit 210.

The zero forcing circuit 210 receives ideal signal 223 and the error signal.224. It should be noted that the zero forcing circuit 210 receives the ideal signal 223 instead of the input signal that was received by the conventional LMS circuit in FIG. 1. The zero forcing circuit 210 applies a zero forcing algorithm to produce the coefficient signal 225 that alters the coefficients in the adaptive filter 208. Although the zero forcing algorithm is a known mathematical theory, it has not been applied to disk drive systems as specified by the present invention. The zero forcing algorithm is:

$$C_{K+1}=C_K+\mu e_K I_K$$

where:
- $C_{K+1}$=the new coefficient signal 225
- $C_K$=the old coefficient signal 225
- $\mu$=the step size
- $I_K$=the ideal signal 223; and
- $e_K$=the error signal 224=$i_K$(ideal signal 223)–$y_K$(output signal 222).

Those skilled in the art will appreciate values to use for the step size and the initial coefficients.

The adaptive filter 208 uses the coefficient signal 225 to modify its coefficients. Due to the zero forcing circuit 210, the adaptive filter 208 coefficients converge to a solution closer to optimal bit error rate performance than convergence using an LMS algorithm. Thus, the zero forcing circuit 210 improves the performance of the disk drive system 202 by reducing the bit error rate of the signal 226.

Figure 3:
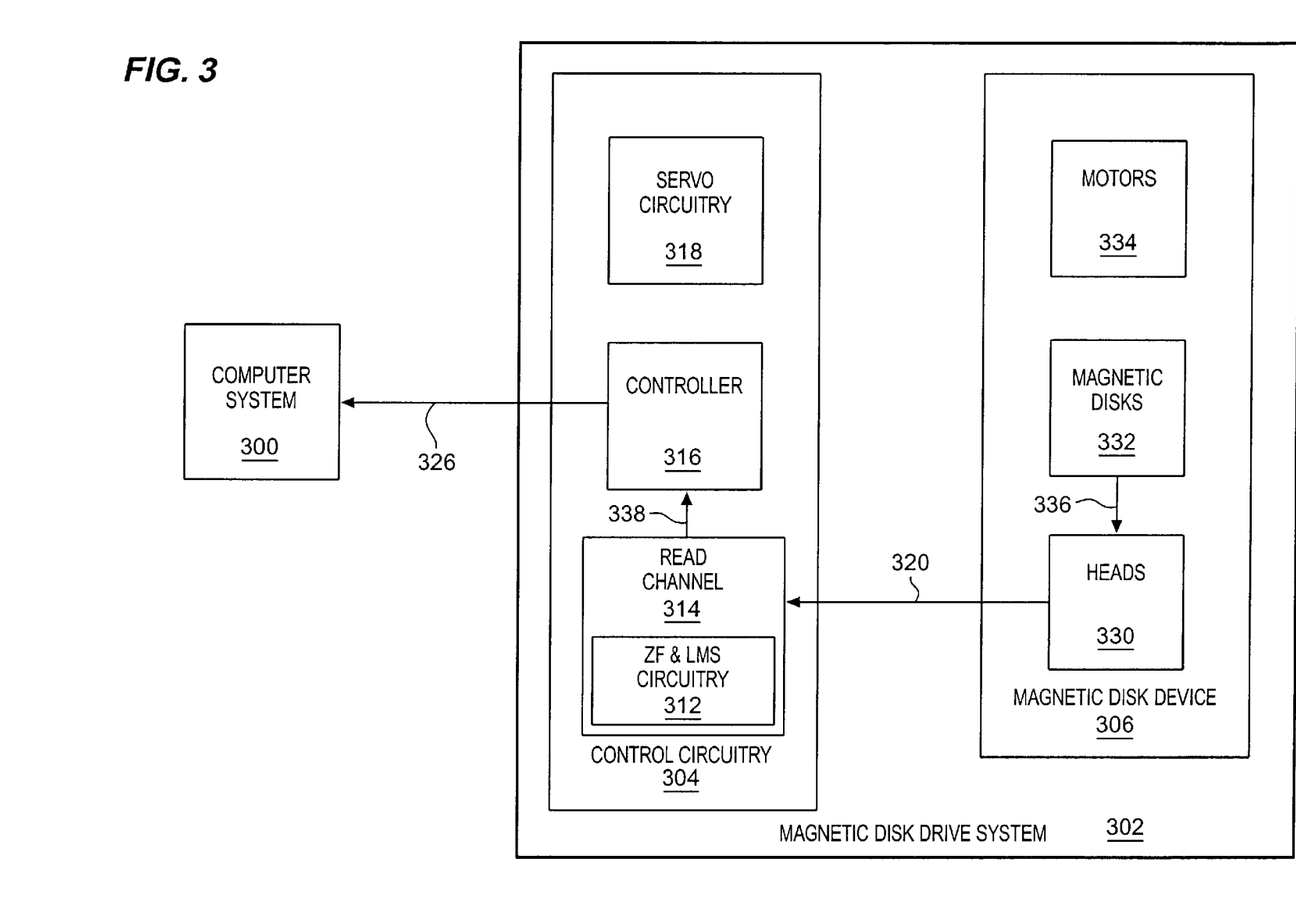
FIG. 3 is a block diagram that depicts a magnetic disk drive system in an example of the invention.
Figure 4:
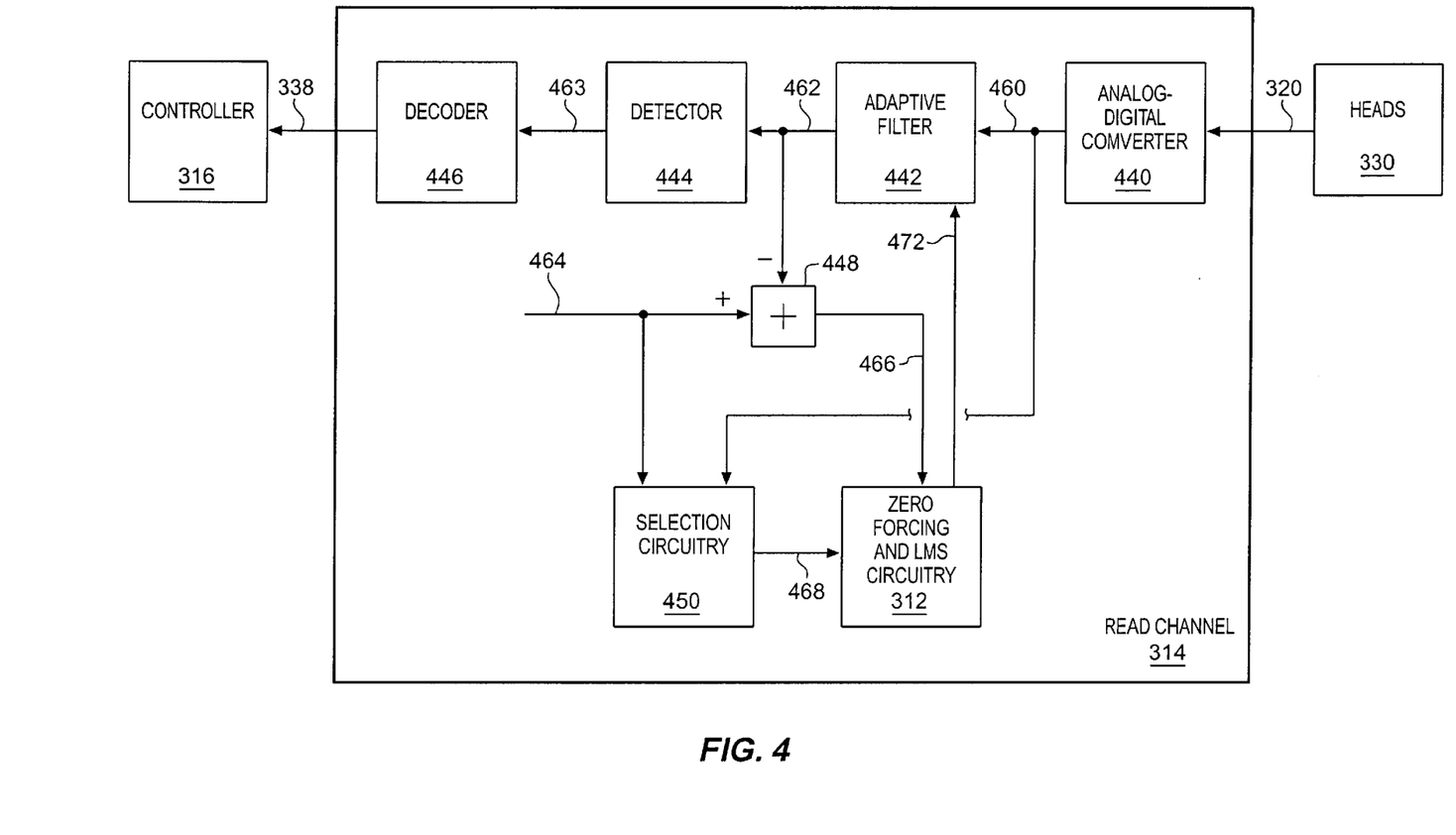
FIG. 4 is a block diagram that depicts read channel circuitry in an example of the invention.

Magnetic Disk Drive System—FIGS. 3–4

FIGS. 3–4 depict a specific example of a magnetic disk drive system in accord with the present invention. Those skilled in the art will appreciate numerous variations from this example that do not depart from the scope of the invention. Those skilled in the art will also appreciate that various features described below could be combined with the above-described embodiment to form multiple variations of the invention.

FIG. 3 depicts a magnetic disk drive system 302 that is configured and operates in accord with the invention. The magnetic disk drive system 302 includes control circuitry 304 and a magnetic disk device 306. The control circuitry 304 includes read channel 314, controller 316, and servo circuitry 318. The read channel 314 includes zero forcing and LMS circuitry 312. The magnetic disk device 306 includes heads 330, magnetic disks 332, and motors 334. Aside from the zero forcing circuitry, the components on FIG. 3 could be conventional.

The magnetic disk drive system 302 is operational to receive data from the computer system 300 and write the data to the magnetic disks 332. The magnetic disk drive system 302 is operational to subsequently read the data from the magnetic disks 332 and provide the data to the computer system 300.

In a typical read operation, the controller 316 receives a request from the computer system 300 to retrieve data previously stored on the magnetic disks 332. The controller 316 instructs the servo circuitry 318 to control the motors 334 to position one of the heads 330 over a sector that stores the requested data on one of the magnetic disks 332. Once positioned, the head reads a signal 336 from the sector on the magnetic disk. The head amplifies the signal 336 to generate the analog signal 320 and transfers the analog signal 320 to the read channel 314. The read channel 314 converts the analog signal 320 into a digital signal 338. During this conversion, the zero forcing and LMS circuitry 312 in the read channel 314 provide a coefficient signal to the adaptive filter (not shown) that equalizes the digital signal. The read channel 314 transfers the digital signal 338 to the controller 316. The controller 316 buffers the digital data from the signal 338 and subsequently generates the digital signal 326 using the buffered data. The controller 316 transfers the digital signal 326 containing the requested data to the computer system 300.

FIG. 4 depicts the read channel 314. The read channel 314 includes an Analog-to-Digital Converter (ADC) 440, an adaptive filter 442, a detector 444, a decoder 446, an adder 448, selection circuitry 450, and zero forcing and LMS circuitry 312. Aside from the zero forcing aspects of the read channel 314, the components on FIG. 4 could be conventional.

In operation, the ADC 440 receives the analog signal 320 from the heads 330 and samples the analog signal 320 to generate a sampled signal 460. The adaptive filter 442 receives the sampled signal 460 and digitally shapes the pulses represented in the sampled signal 460 based on internally programmable coefficients. The goal of the filtering is to produce an equalized signal 462 having pulses with a shape that is expected by the detector 444. The adaptive filter 442 transfers the equalized signal 462 to the detector 444. The detector 444 detects binary data from the equalized signal 462 and transfers a corresponding binary signal 463 to the decoder 446. The decoder 446 processes the binary signal 463 to remove encoding used during the write process to produce the digital signal 338. The decoder 446 transfers the digital, signal 338 to the controller 316.

The adder 448 receives a copy of the equalized signal 462 and an ideal signal 464. The ideal signal 464 can be generated in numerous ways, such as using a slicer on the equalized signal 462 or by using a digital copy of the data stored on the disk device. The adder 448 subtracts the equalized signal 462 from the ideal signal 464 to generate the error signal 466. The adder 448 provides the error signal 466 to the zero forcing and LMS circuitry 312.

The selection circuitry 450 receives copies of the sampled signal 460 and the ideal signal 464. The selection circuitry 450 allows the user to select either zero forcing or LMS to generate the coefficient signal 472. If zero forcing is selected, then the selection circuitry 450 passes the ideal signal 464 as an input signal 468 to the zero forcing and LMS circuitry 312. If LMS is selected, then the selection circuitry 450 passes the sampled signal 460 as the input signal 468 to the zero forcing and LMS circuitry 312. Thus, the zero forcing and LMS circuitry 312 receives the error signal 466 and either the sampled signal 460 or the ideal signal 464 based on user selection.

If zero forcing is selected, the zero forcing and LMS circuitry 312 applies the zero forcing algorithm to the ideal signal 464 and the error signal 466 to produce the coefficient signal 472. If LMS is selected, the zero forcing and LMS circuitry 312 applies the LMS algorithm to the sampled signal 460 and the error signal 466 to produce the coefficient signal 472. The zero forcing algorithm and the LMS algorithm are described above, and it should be appreciated that the selection circuitry 450 selects between the $I_K$ or $X_K$ component of these two algorithms.

The zero forcing and LMS circuitry 312 provides the coefficient signal 472 to the adaptive filter 442. The adaptive filter 442 uses the coefficient signal 472 to modify its coefficients. Typically, the adaptive filter 442 is tuned before standard operation. To tune the adaptive filter 442, the user first selects either zero forcing or LMS to provide the coefficient signal 472. A test signal is then provided to the adaptive filter 442 and the coefficients are allowed to converge toward a solution. After tuning, these optimal coefficients are fixed within the adaptive filter 442.

Figure 5:
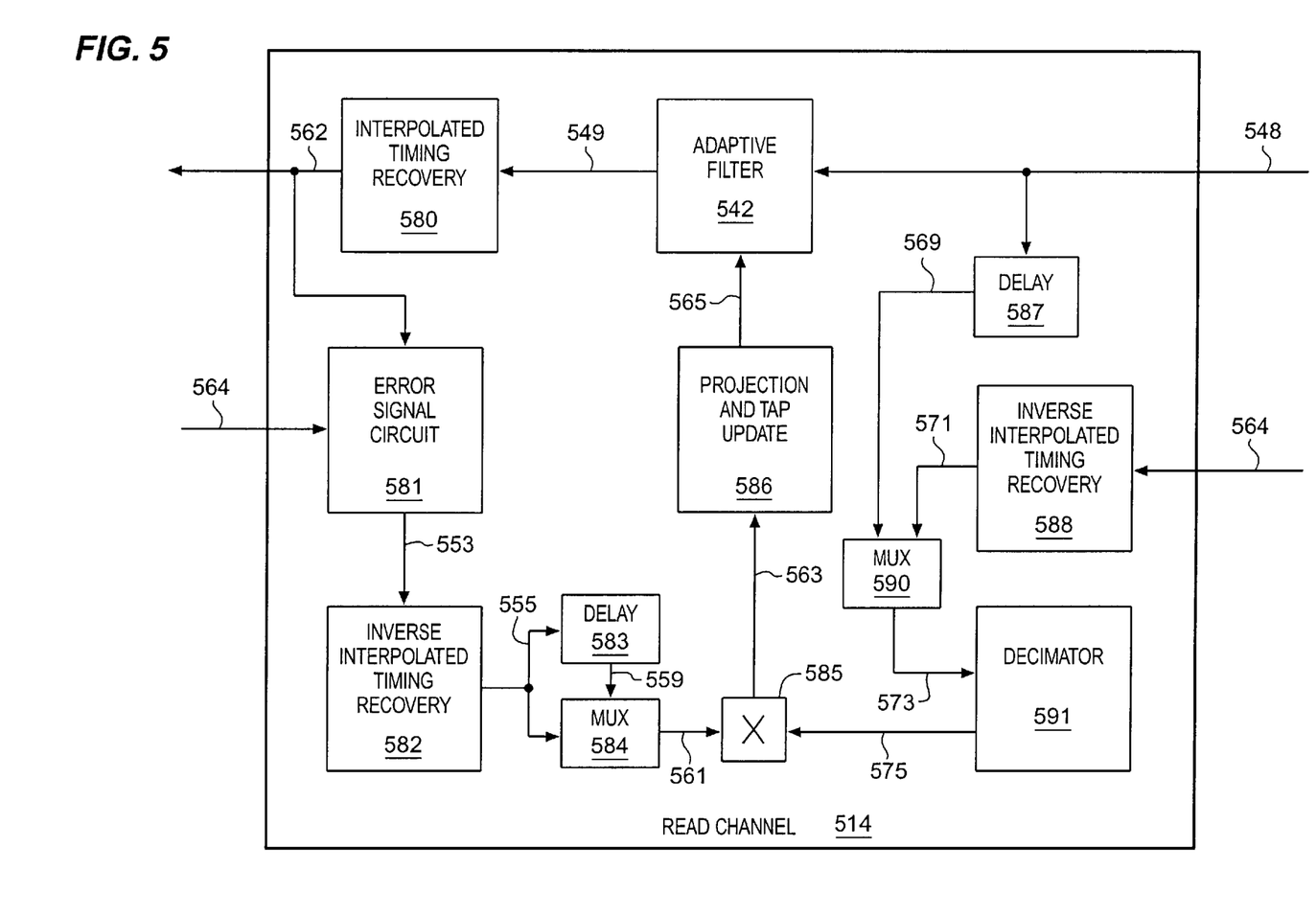
FIG. 5 is a block diagram that depicts read channel circuitry in an example of the invention.
Figure 6:
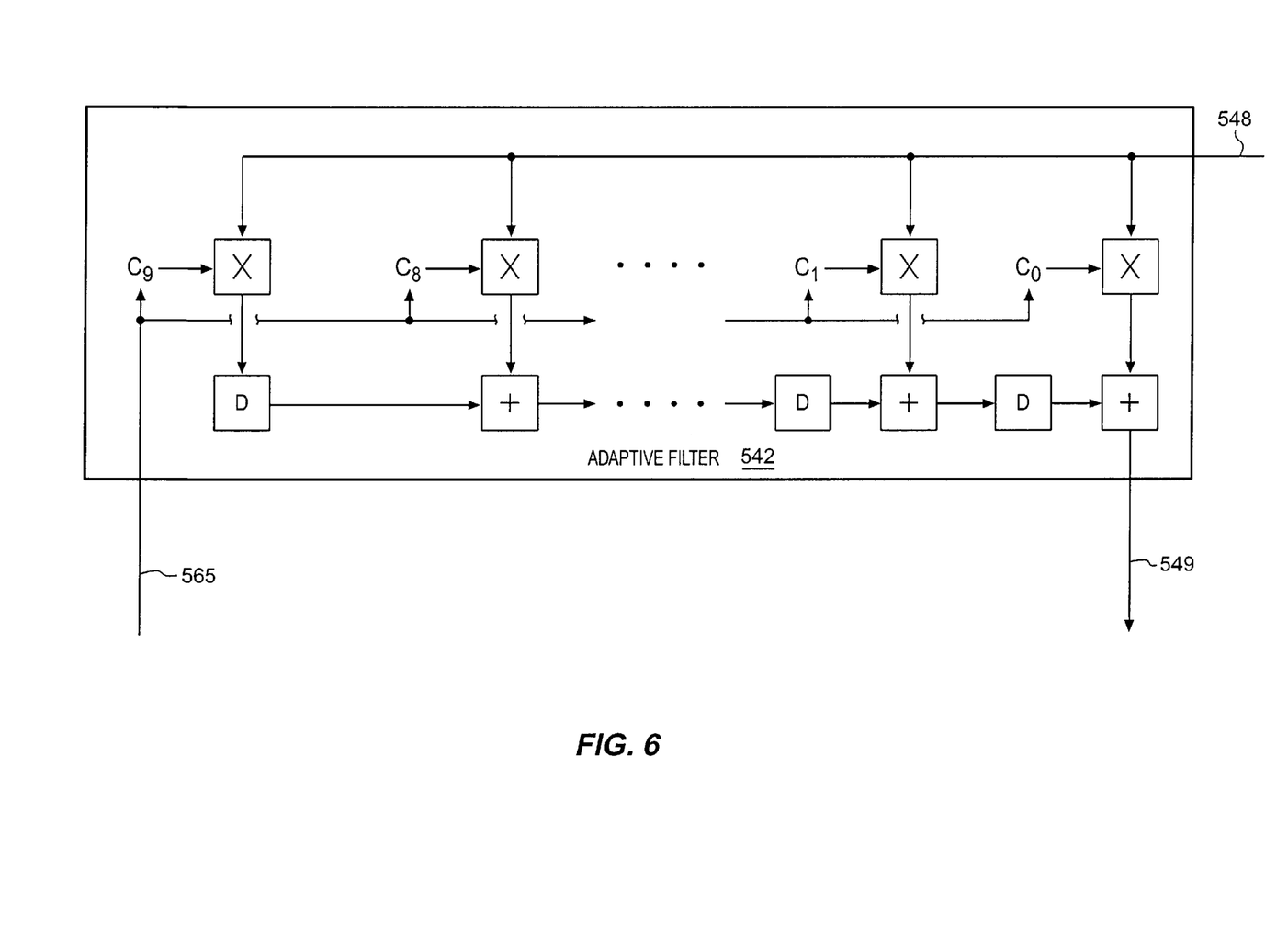
FIG. 6 is a block diagram that depicts adaptive filter circuitry in an example of the invention.

Read Channel—FIGS. 5–6

FIGS. 5–6 depict a specific example of the read channel circuitry in accord with the present invention. Those skilled in the art will appreciate numerous variations from this example that do not depart from the scope of the invention. Those skilled in the art will also appreciate that various features described below could be combined with the above embodiments to form multiple variations of the invention.

The read channel 514 is comprised, of adaptive filter 542, interpolated timing recovery 580, error signal circuit 581, inverse interpolated timing recovery 582, delay 583, mux 584, multiplier 585, projection and tap update 586, delay 587, inverse interpolated timing recovery 588, mux 590, and decimator 591. The adaptive filter 842 receives and equalizes the sampled signal 548 using variable coefficients to generate an equalized signal 549. The adaptive filter 542 provides the equalized signal 549 to the interpolated timing recovery 580.

The interpolated timing recovery 580 generates a timed-equalized signal 562 based on the pulse samples in the equalized signal 549 by adding an estimated sample at a detection time point. The interpolated timing recovery 580 provides the timed-equalized 562 signal to detector circuitry (not shown) and to the error signal circuit 581. The error signal circuit 581 receives an ideal signal 564 which is typically ideal PR4 data. The error signal circuit 581 generates an error signal 553 by subtracting the time-equalized signal 562 from ideal signal 564. The error signal circuit 581 provides the error signal 553 to the inverse interpolated timing recovery 582. The inverse interpolated timing recovery 582 re-adjusts the timing of the error signal 553 back to the clock rate of the adaptive filter 542 to counter the timing effects of the interpolated timing recovery 580. The inverse interpolated timing recovery 582 provides the time-adjusted error signal 555 to both the delay 583 and to the mux 584.

The delay 583 is an adjustable delay that is set to account for the delay of the adaptive filter 542 to synchronize the time-adjusted error signal 555 with the ideal signal 564. The delay 583 provides the delayed-time-adjusted error signal 559 to the mux 584. The mux 584 allows the user to select either zero forcing or LMS. If zero forcing is selected, the mux 584 passes the delayed-time-adjusted error signal 559 as the selected error signal 561 to the multiplier 585. If LMS is selected, the mux 584 passes the time-adjusted error signal 555 as the selected error signal 561 to the multiplier 585.

The sampled signal 548 is also received by the delay 587. The delay 587 introduces a delay to subsequently match the signals 561 and 575 that are received into the multiplier 585 when LMS is selected. The delay 587 provides a delayed-sampled signal 569 to the mux 590. The inverse interpolated timing recovery 588 is the same as inverse interpolated timing recovery 582. The inverse interpolated timing recovery 588 also receives the ideal signal 564. The inverse interpolated timing recovery 588 provides a time-adjusted ideal signal 571 to the mux 590.

The mux 590 allows the user to select either zero forcing or LMS. If zero forcing is selected, the mux 590 passes the time-adjusted ideal signal 571 as the selected signal 573 to the decimator 591. If LMS is selected, the mux 590 passes the delayed sampled signal 569 as the selected error signal 561 to the decimator 591. It should be appreciated that mux 590 effectively switches between the $I_K$ or $X_K$ component of the above described zero forcing and LMS algorithms. The decimator 591 receives the selected signal 573. The decimator 591 decimates the selected signal 573 by a factor of ten and provides the decimated-selected signal 575 to the multiplier 585.

The multiplier 585 receives and multiplies the selected error signal 561 and the decimated-selected signal 575 to generate a product signal 563. If zero forcing is selected, the product signal 563 is comprised of the delayed-time-adjusted error signal multiplied by the decimated-time-adjusted ideal signal. If LMS is selected, the product signal 563 is comprised of the time-adjusted error signal multiplied by the decimated-delayed sampled signal. The multiplier 585 provides its product signal 563 to the projection and tap update 586. Based on user selection through the muxes 584 and 590, the projection and tap update 586 applies either the zero forcing or LMS algorithm to the product signal 563 to provide a coefficient signal 565 to the adaptive filter 542. The adaptive filter 542 modifies its coefficients based on the coefficient signal 565. The projection and tap update 586 fixes the filter response at a frequency equal to the sample frequency divided by four ($f_S/4$). In other words, the frequency response of the adaptive filter 542 at $f_S/4$ is fixed to a set value.

FIG. 6 depicts the adaptive filter 542. The adaptive filter 542 receives the sampled signal 548 and forms the pulses in the sampled signal 548 into a shape expected by the detector (not shown). The adaptive filter 542 is a digital FIR Type II adaptive filter with ten taps that uses PR4 for an equalization target. The ten taps are alternatively updated five at a time by the coefficient signal 565. In operation, the sampled signal 548 is provided to a series of multipliers where it is multiplied by the coefficients $C_0$–$C_9$. The products from the multipliers are delayed and summed to generate the equalized signal 549.

For the ten tap adaptive filter 542, the term $e_K I_K$ in the zero forcing algorithm can be represented by the following values: [$e_K i_K$, $e_K i_{K-1}$, $e_K i_{K-2}$, $e_K i_{K-3}$, $e_K i_{K-4}$, $e_K i_{K-5}$, $e_K i_{K-6}$, $e_K i_{K-7}$, $e_K i_{K-8}$, $e_K i_{K-9}$]. A more economically efficient implementation replaces the term $e_K I_K$ in the zero forcing algorithm with $i_K E_K$. For the ten tap adaptive filter 542, the term $i_K E K$ in the zero forcing algorithm can be represented by the following values: [$i_K e_K$, $i_K e_{K+1}$, $i_K e_{K+2}$, $i_K e_{K+3}$, $i_K e_{K+4}$, $i_K e_{K+5}$, $i_K e_{K+6}$, $i_K e_{K+7}$, $i_K e_{K+8}$, $i_K e_{K+9}$].

The following United States patent applications discuss the read channel circuitry in greater detail and are hereby incorporated by reference: U.S. Pat. No. 5,760,984 entitled "COST REDUCED INTERPOLATED TIMING RECOVERY IN A SAMPLED AMPLITUDE READ CHANNEL"; U.S. Pat. No. 5,563,819 entitled "FAST HIGH PRECISION DISCRETE-TIME ANALOG FINITE IMPULSE RESPONSE FILTER"; U.S. Pat. No. 5,696,639 entitled "SAMPLED AMPLITUDE READ CHANNEL EMPLOYING INTERPOLATED TIMING RECOVERY"; U.S. Pat. No. 5,717,619 entitled "COST REDUCED TIME VARYING FIR FILTER"; and U.S. Pat. No. 5,726,818 entitled "MAGNETIC DISK SAMPLED AMPLITUDE READ CHANNEL EMPLOYING INTERPOLATED TIMING. RECOVERY FOR SYNCHRONOUS DETECTION OF TIMING EMBEDDED DATA"; all of which are assigned to Cirrus Logic of Fremont, Calif.

Figure 7:
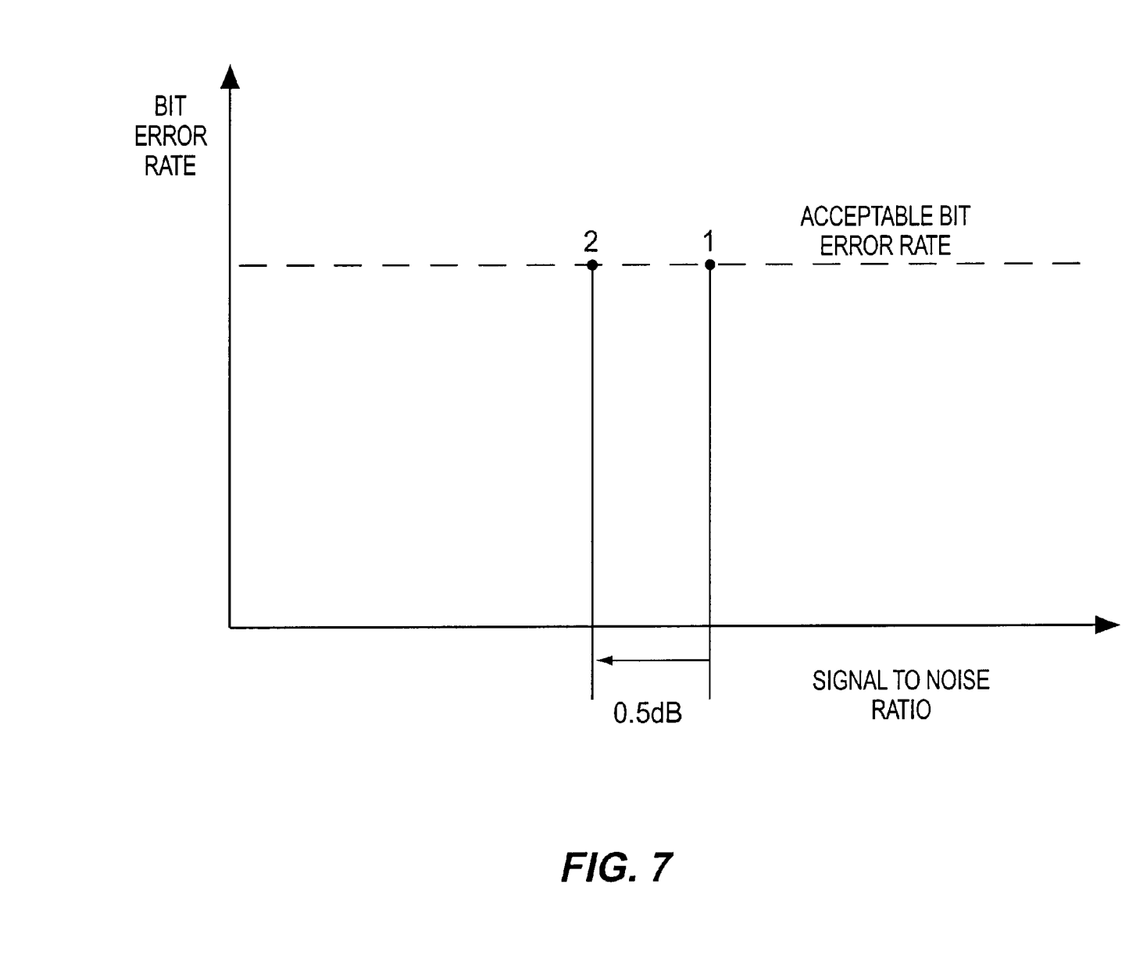
FIG. 7 is a graph that depicts the performance of a conventional disk drive system versus the performance a disk drive system that operates in accord with the invention.

Performance Comparison—FIG. 7

FIG. 7 depicts the performance benefit achieved by using the zero forcing of the present invention. The vertical axis represents the bit error rate of the read channel, and the horizontal axis represents the signal-to-noise ratio. An acceptable bit error rate is marked by the dashed line. The point 1 represents the signal-to-noise ratio required to attain an acceptable bit error rate in a conventional read channel using LMS. The point 2 represents the signal-to-noise ratio required to attain an acceptable bit error rate in a read channel using zero forcing as in the present invention. The signal-to noise ratio may be decreased by 0.5 dB while maintaining an acceptable bit error rate when the invention is used. The 0.5 dB value represents an exponential decrease in the required signal-to-noise ratio. With the invention, more noise can be tolerated or less signal power can be used. This means that either disk drive error performance is improved or disk drive components can be less expensive than before while maintaining the same performance.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. Disk drive control circuitry comprising:
   adaptive filter circuitry configured to shape an input signal based on a plurality of coefficients to produce an equalized signal and to adjust the coefficients based on a coefficient signal, wherein the input signal represents data from a disk device and an error signal represents an ideal signal minus the equalized signal; and
   zero forcing circuitry configured to adjust timing of the error signal to a clock rate of the adaptive filter circuitry and multiply the error signal with the ideal signal to generate the coefficient signal.

2. The disk drive control circuitry of claim 1 further comprising least mean square circuitry configured to generate the coefficient signal.

3. The disk drive control circuitry of claim 2 wherein the least mean square circuitry is configured to generate the coefficient signal by multiplying the error signal with the input signal.

4. The disk drive control circuitry of claim 3 further comprising selection circuitry configured to select between the zero forcing circuitry and the least mean square circuitry to provide the coefficient signal.

5. The disk drive control circuitry of claim 1 further comprising servo circuitry.

6. The disk drive control circuitry of claim 1 further comprising a disk drive controller.

7. The disk drive control circuitry of claim 1 wherein the disk drive control circuitry is in read channel circuitry.

8. The disk drive control circuitry of claim 7 further comprising an analog-to-digital converter.

9. The disk drive control circuitry of claim 7 further comprising a detector and a decoder.

10. A method for operating disk drive control circuitry, the method comprising:
    shaping an input signal in an adaptive filter based on a plurality of coefficients to generate an equalized signal, wherein the input signal represents data from a disk device and an error signal represents an ideal signal minus the equalized signal;
    adjusting timing of the error signal to a clock rate of the adaptive filter; and
    multiplying the error signal with the ideal signal to adjust the coefficients using a zero forcing algorithm.

11. The method claim 10 further comprising selecting the zero forcing algorithm to adjust the coefficients from between the zero forcing algorithm and a least mean square algorithm.

12. The method of claim 10 further comprising sampling an analog signal from the disk device to generate the input signal.

13. The method of claim 10 further comprising detecting binary data in the equalized signal and decoding the binary data to generate a digital signal that represents the data.

* * * * *